(12) United States Patent
Jiang et al.

(10) Patent No.: US 10,460,454 B2
(45) Date of Patent: Oct. 29, 2019

(54) MOTION-BASED FACIAL RECOGNITION

(71) Applicant: Shanghai XPT Technology Limited, Shanghai, OT (CN)

(72) Inventors: Yu-Sian Jiang, Kaohsiung (TW); Jean-Noel Braun, Taipei (TW); Mu-Jen Huang, Taipei (TW)

(73) Assignees: Shanghai XPT Technology Limited, Shanghai, OT (CN); Mindtronic AI Co., Ltd., Taipei (TW)

( * ) Notice: Subject to any disclaimer, the term of this patent is extended or adjusted under 35 U.S.C. 154(b) by 0 days.

(21) Appl. No.: 16/285,267

(22) Filed: Feb. 26, 2019

(65) Prior Publication Data

US 2019/0188867 A1      Jun. 20, 2019

Related U.S. Application Data

(63) Continuation-in-part of application No. 15/935,053, filed on Mar. 25, 2018.

(30) Foreign Application Priority Data

| Nov. 9, 2017 | (CN) | .......................... 2017 1 1099567 |
| Nov. 9, 2017 | (CN) | ...................... 2017 2 1487383 U |
| Mar. 21, 2018 | (CN) | .......................... 2018 1 0237040 |
| Mar. 21, 2018 | (CN) | ...................... 2018 2 0387687 U |

(51) Int. Cl.
| G06K 9/00 | (2006.01) |
| G06T 7/246 | (2017.01) |
| G06F 16/735 | (2019.01) |

(52) U.S. Cl.
CPC ............ G06T 7/248 (2017.01); G06F 16/735 (2019.01); G06K 9/00228 (2013.01); G06K 9/00268 (2013.01)

(58) Field of Classification Search
USPC ........................................................ 382/118
See application file for complete search history.

(56) References Cited

U.S. PATENT DOCUMENTS

| 9,202,105 B1 | 12/2015 | Wang |
| 2017/0061970 A1 | 3/2017 | Escott |

*Primary Examiner* — Stephen P Coleman
(74) *Attorney, Agent, or Firm* — Patents and Licensing LLC; Daniel W. Juffernbruch; John G. Fijolek (57) ABSTRACT

An apparatus, system and method of motion-based facial recognition is provided through the establishment of facial motion profiles. The system uses a database, a camera and a processing unit. The database stores a predetermined profile of a default facial motion made by a user having at least one facial landmark. The camera tracks the user's facial motions and captures a facial motion over a duration. The processing unit connected to the database and the camera. The processing unit establishes the predetermined profile and a comparison profile of the facial motion through a profile establishment process. The processing unit further compares the comparison profile with the predetermined profile to verify the facial motion.

17 Claims, 9 Drawing Sheets

MOTION-BASED FACIAL RECOGNITION

CROSS-REFERENCE TO RELATED APPLICATIONS

This patent application claims the benefit of U.S. patent application Ser. No. 15/935,053 ("'053 parent application") filed on 25 Mar. 2018 which is incorporated by reference herein.

BACKGROUND OF THE INVENTION

1. Technical Field

The present disclosure relates generally to motion-based facial recognition. More particularly, the present disclosure relates to establishing profiles of facial motions for the sake of facial recognition.

2. Related Art

Facial recognition has become a way to identify people. Various proposals and innovations have been made aiming to improve the identity recognition rate. Facial recognition is typically based upon still images. Some systems may claim they are "dynamic" because they are operable even when a subject user is moving. However, their operations nevertheless depend entirely on an instantly captured image which is "static" in nature.

SUMMARY OF THE INVENTION

Certain embodiments disclosed herein are set forth below. It should be understood that the aspects of the invention presented herein merely provide the reader with a summary of these certain embodiments and are not intended to limit the scope of this disclosure. Indeed, this disclosure encompasses a variety of implementations that may not be discussed in the embodiments presented. Aspects of this invention can be implemented in numerous ways, including as a process, an apparatus, a system, a composition of matter, a computer readable storage medium or a computer network. A component such as a processing unit or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processing unit' refers to one or more devices, circuits, and/or processing cores configured to process data, such as computer program instructions.

According to some embodiments, a system and apparatus of facial recognition based on facial motions are described. The system and apparatus include: a database, a camera, and processing unit components. The processing unit establishes a predetermined profile that includes a representation of a dynamic image of a facial motion that includes at least one facial landmark created from a first video clip. The database stores the predetermined profile and optionally maps to functions that utilize the facial recognition. The camera tracks the user's facial motions and captures a resembling second video clip where a user makes a resembling facial motion and at least one facial expression over a duration. The processing unit monitors captured video clips. The processing unit establishes a resembling profile from the dynamic image of a resembling facial motion. The processing unit further compares the resembling profile with the predetermined profile to associate the resulting facial recognition with a stored utility to be exercised on verification of the resembling facial motion.

According to some embodiments, a method of facial recognition based on predetermined profiles of facial motions made by a user having at least one facial landmark is described. The method includes: establishing a predetermined profile of a default facial motion through a profile establishment process from a first video clip; capturing a resembling second video clip over a duration during which the user makes a resembling facial motion and at least one facial expression; establishing a resembling profile of the resembling facial motion through the profile establishment process; and comparing the resembling profile with the predetermined profile to verify the resembling facial motion. Utilizing the facial motion recognition to operate a function.

According to some embodiments, a method of motion-based facial recognition is described. The method includes establishing a predetermined profile that represents a facial motion of a user for facial recognition. The establishment step further includes: distilling at least one facial landmark of the user; tracking and capturing a first video clip over a duration, wherein the video clip has a plurality of primary facial patterns where the user makes the facial motion, and a plurality of collateral facial patterns where the user makes at least one facial expression before, after, or before and after the facial motion; tagging the facial landmark on each of the primary and the collateral facial patterns; and establishing the predetermined profile of the facial motion based on the primary and the collateral facial patterns.

All illustrations of the drawings are for the purpose of describing selected versions of the present invention and are not intended to limit the scope of the present invention.

DETAILED DESCRIPTION OF THE PREFERRED EMBODIMENTS

To accomplish the foregoing and related aspects of the invention, one or more examples comprise the features hereinafter fully described and particularly pointed out in the claims. The following description and the annexed drawings set forth in detail certain illustrative aspects that are indicative of but a few of the various ways in which the principles of the various aspects may be employed. Other advantages and novel features will become apparent from the following detailed description when considered in conjunction with the drawings and the disclosed examples including all such aspects and their equivalents.

The '053 parent application discloses a face recognition system, apparatus and system based on a dynamic facial motion. The dynamic facial motion forms a unique key to unleash one or more binding services/functions. Assuming a user has pre-recorded a smiling as a key to performing a certain action, say, turn on the wipers of a vehicle; and the user's ID is not an issue. According to the disclosure, an image capturing device, such as a camera, disposed in the vehicle tracks the user's facial motions continuously to see if the user smiles to embark the performance. In a hypothetical scenario where the user is talking to someone else while driving, the camera captures his/her facial patterns which happen to be identical to a smiling. Under that circumstance, the wipers may just start sweeping without further confirmations because of the successful recognition. This sudden move may distract the driver and is dangerous.

Although there have been lots of innovations made to the conventional facial recognition systems to reduce false recognition, none of them would be applicable when it comes to the motion-based realm. The main reason is, static-based recognitions are rather easy because all factors and parameters are constant. In terms of motion-based facial recognition, on the contrary, variables of facial features must all be examined which complicates the processes and calculations enormously.

The instant invention discloses a system and a method of motion-based facial recognition through the establishment of a predetermined facial motion profile. The adoption of the invention will not only improve the accuracy of facial recognition in the true dynamic state, but also eliminate the chance of false recognition.

Figure 1:
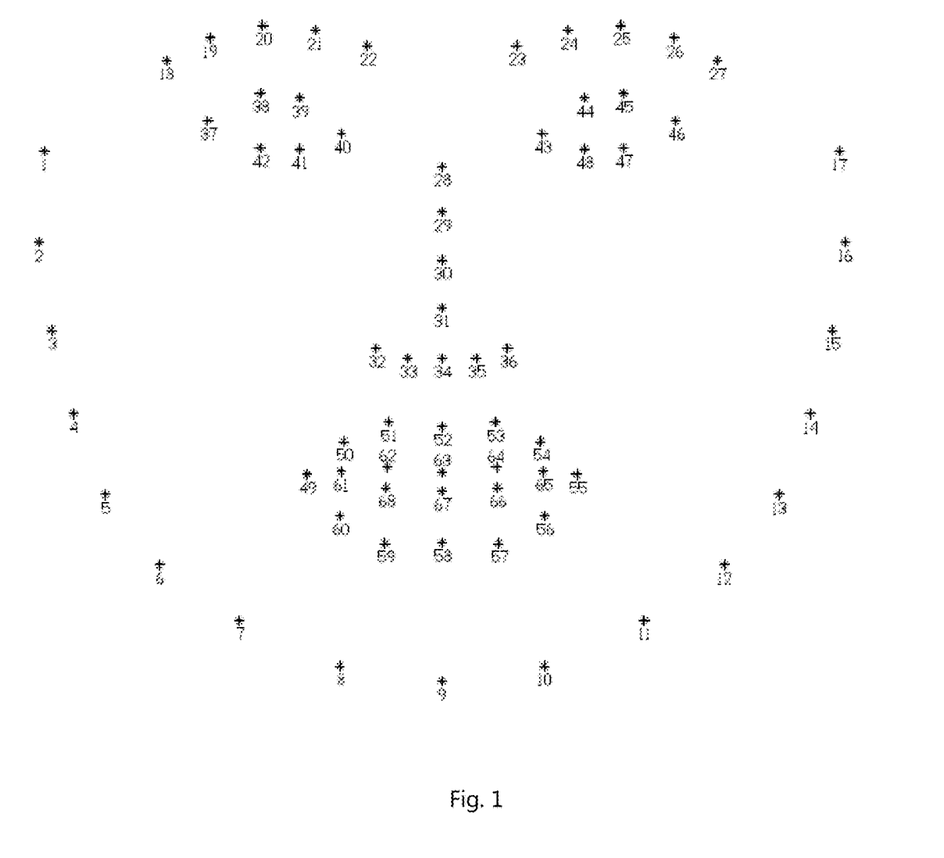
FIG. 1 is a diagram of an example showing 68 facial landmarks are distilled from a user's face.

Face recognition starts with obtaining a person's facial features. There are plenty of ways to select facial landmarks, features and/or key points known to skilled people. In one embodiment, a facial recognition system spots several distinctive facial landmarks/features on a primary user's face. As shown in FIG. 1, in one embodiment, 68 unique facial landmarks (i.e. collectively called "label data") are distilled from the primary user's facial image. The label data is trained through known techniques like neural network to derive a trained model. The label data as well as the trained model are stored in a database for later use. For any subsequent recognition, the system will try to fetch the same 68 facial landmarks from the person subject to verification and throw the fetched data into the trained model. If they match, the system verifies that the person is de facto the primary user. There could be more than one primary users whose label data are stored and trained. The system can be designed to authenticate multiple users so long as their data are in the database. Further, the number—68 is a mere example and should not be regarded as a limitation to the invention.

It is noteworthy that the 68 facial landmarks will not always be evaluated in every recognition process. In some scenarios the system may only consider those landmarks it thinks relevant and ignores those irrelevant. This approach can reduce the processing time though the accuracy might be compromised.

The detailed process of motion-based facial recognition as to a person identity has been disclosed in the '053 parent application and will not be repeated in the instant application. The invention will focus on a facial recognition system and apparatus through facial motion profiles and a method thereof.

Figure 2:
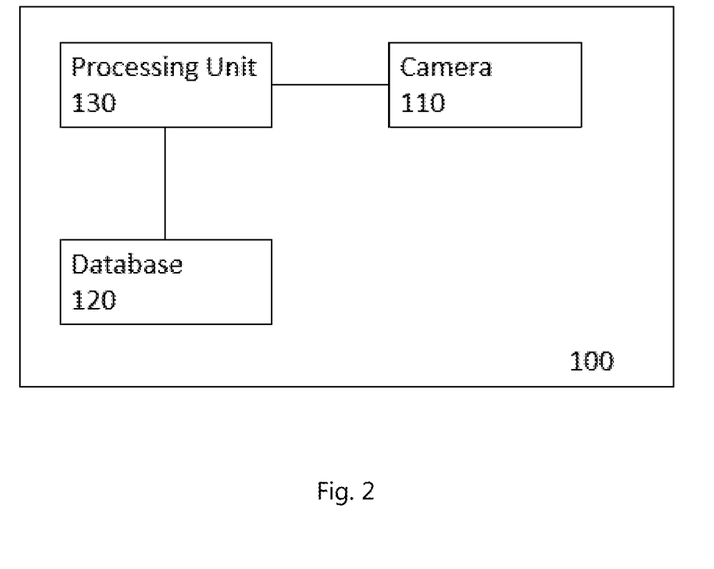
FIG. 2 is a schematic block diagram depicting a system of facial recognition based on facial motions in accordance with the present invention.
Figure 3:
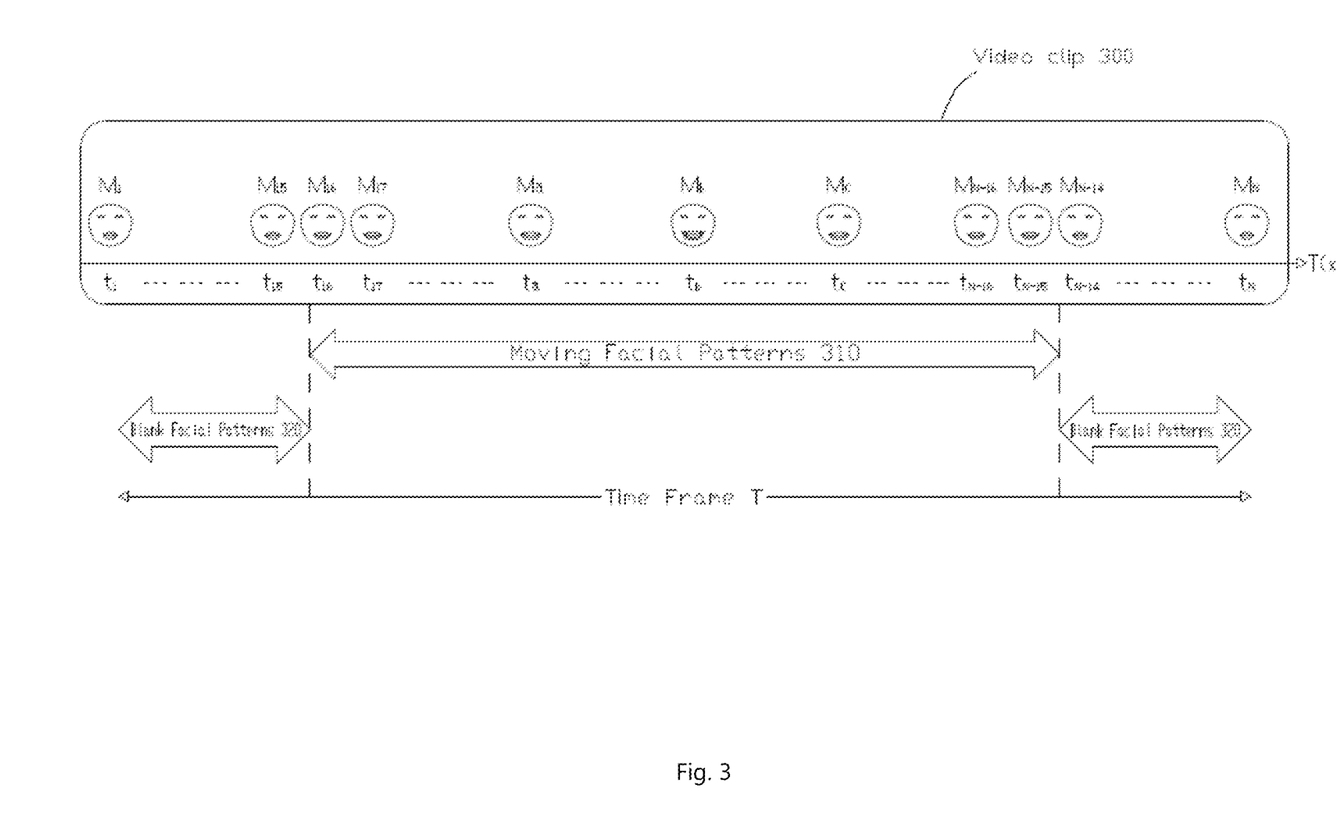
FIG. 3 illustrates a video clip over a time frame having a plurality of moving facial patterns and a plurality of blank facial patterns.

The facial recognition system 100 in accordance with the present invention is through the establishments of profiles concerning facial motions. The structure of the system 100 is depicted in FIG. 2, including: 1) a database 120 that stores a predetermined profile of a default facial motion made by a user and at least one facial landmark of the user, 2) a camera 110 that tracks the user's facial changes and captures a video clip over a duration, and 3) a processing unit 130 that establishes profiles of facial motions. Additionally, the processing unit 130 further compares the profile of a resembling facial motion with the predetermined profile to verify the resembling facial motion. The facial recognition system 100 may further equip with a computer readable storage medium (not shown in the diagram) to store images and video clip captures by the camera 110, and data processed by the processing unit 130. FIG. 3 is an example showing the facial changes over a smiling and blank expressions over the duration T. The operation of the facial recognition system 100 will be clarified in detail with reference to FIGS. 2 and 3 as follows.

In one embodiment, the system 100 establishes a predetermined profile for a default facial motion beforehand as a reference for the later motion-based facial recognition. As stated previously, the default facial motion may be associated with a function which, when the user is recognized as performing that motion, will unleash the operation of the function. This could be a standard vehicle function like a wiper, which is ordinarily instigated by operation of a manual or automatic control or an advanced function designed to be only accessible by facial motion recognition operations. To begin with, the camera 110 records a first video clip 300 over a duration T. The video clip 300 includes a plurality of moving facial patterns 310 where the user makes a default facial motion, e.g., a smiling, and a plurality of blank facial patterns 320 where the user is expressionless (i.e. blank expressions). The duration T is sliced into numbers of unit time slots $Tx=\{t_1, t_2, \ldots, t_N\}$ aligning with the facial patterns. It should also be noted that the number of the facial patterns does not necessarily depend on the frame/sampling rate. In one embodiment, one facial pattern can be a combination of multiple frames (e.g. 10 frames), and the length of a unit time slot is the total duration of the combined frame (e.g. the total time length of the 10 frames).

The moving and blank facial patterns $Mx=\{M_1, M_2, \ldots, M_N\}$ altogether constitute the video clip 300. Additionally, each facial pattern represents the instant facial snapshot captured at the relevant moment. For example, the first facial pattern $M_1$ is the instant snapshot of the user at $t_1$, the second facial pattern $M_2$ is the instant snapshot of the user at $t_2$, and so on. In one embodiment, assuming the default facial motion, i.e. a smiling, begins at the $16^{th}$ facial pattern (i.e. $M_{16}$ at $t_{16}$) where the user starts smiling; while the blank expression occurs during the first and the last 15 facial patterns, i.e. $M_1$ to $M_{15}$ and $M_{N-14}$ to $M_N$ during which the user shows no special expression. In this embodiment, it is assumed that the blank facial patterns 320 appear on the both sides of the moving facial patterns 310, the invention however is not limited to so. The primary user may decide to only make a blank expression before or after he/she smiles. In other words, the blank facial patterns 320 can be before, after, or before and after the moving facial patterns 310; either way can fulfill the purpose of the instant invention which will be discussed later.

Once the video clip 300 is enrolled, the predefined 68 facial landmarks (collectively, the "label date") can be tagged on each of the moving and blank facial patterns $Mx=\{M_1, M_2, \ldots, M_N\}$. Moreover, their variations over the duration T can also be determined. It is worth mentioning that in the present embodiment because the default facial motion is a smiling, the system 100 may, for the sake of convenience, only consider the facial landmarks surrounding the user's mouth instead of all the 68. For example, the system 100 of the present invention may only take the 20 facial landmarks around the user's mouth for consideration in the present scenario. Referring to FIG. 1, assuming the 20 relevant facial landmarks are $f_{49}, f_{50}, \ldots,$ and $f_{68}$ represented as $Fx=\{f_{49}, f_{50}, \ldots, f_{68}\}$.

Figure 4:
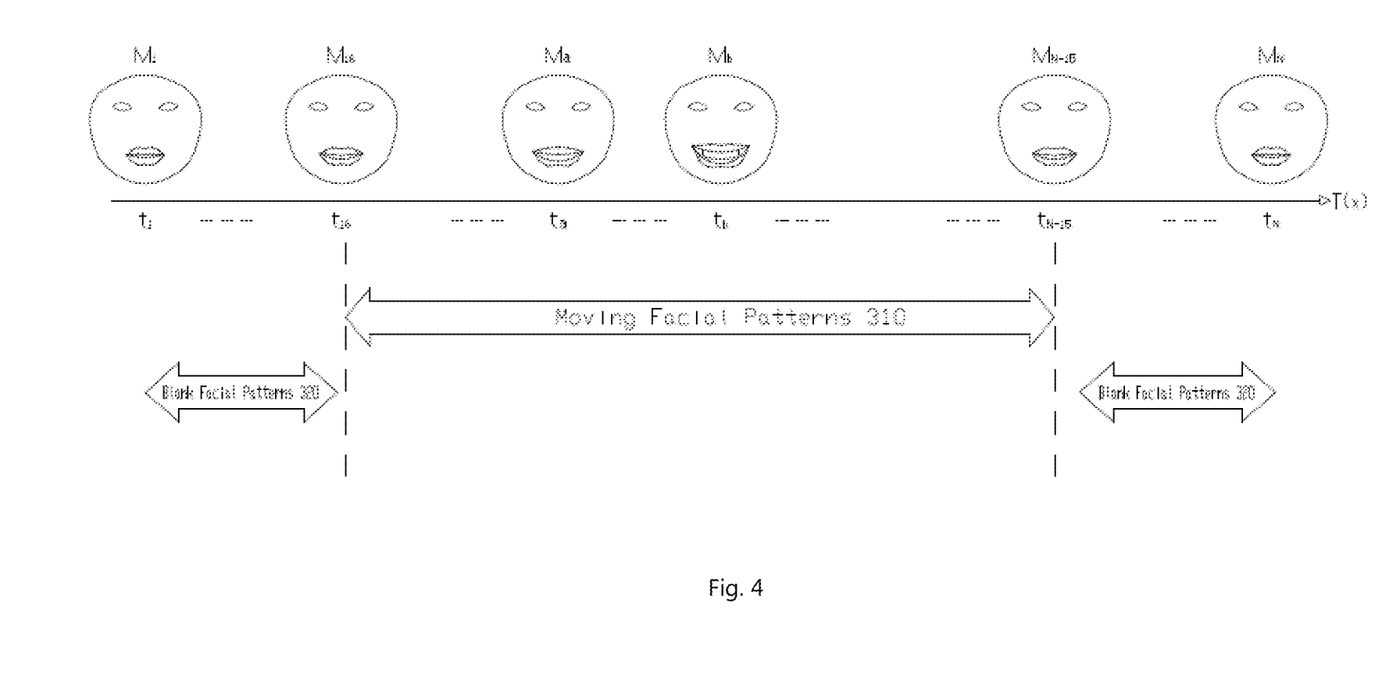
FIG. 4 illustrates an exemplarily video clip over a duration showing the changes of the 20 facial landmarks particularly at $t_1$, $t_{16}$, $t_a$, $t_b$, $t_{N-15}$ and $t_N$.

FIG. 4 exemplarily illustrates the changes of the 20 facial landmarks particularly on the patterns $M_1$, $M_{16}$, $M_a$, $M_b$, $M_{N-15}$, and $M_N$ at $t_1$, $t_{16}$, $t_a$, $t_b$, $t_{N-15}$ and $t_N$ (the rest are omitted from FIG. 4). As aforementioned, the smiling starts at the $16^{th}$ and continues to the $(N-15)^{th}$ unit time slots, i.e. $t_{16}$-$t_{N-15}$, while the first and the last 15 unit time slots are where the blank expressions occur, i.e. $t_1$-$t_{15}$ and $t_{N-14}$-$t_N$. In that regard, $M_1$, and $M_N$ are the blank facial patterns, while $M_{16}$, $M_a$, $M_b$, $M_{N-15}$ are the moving facial patterns.

Figure 5:
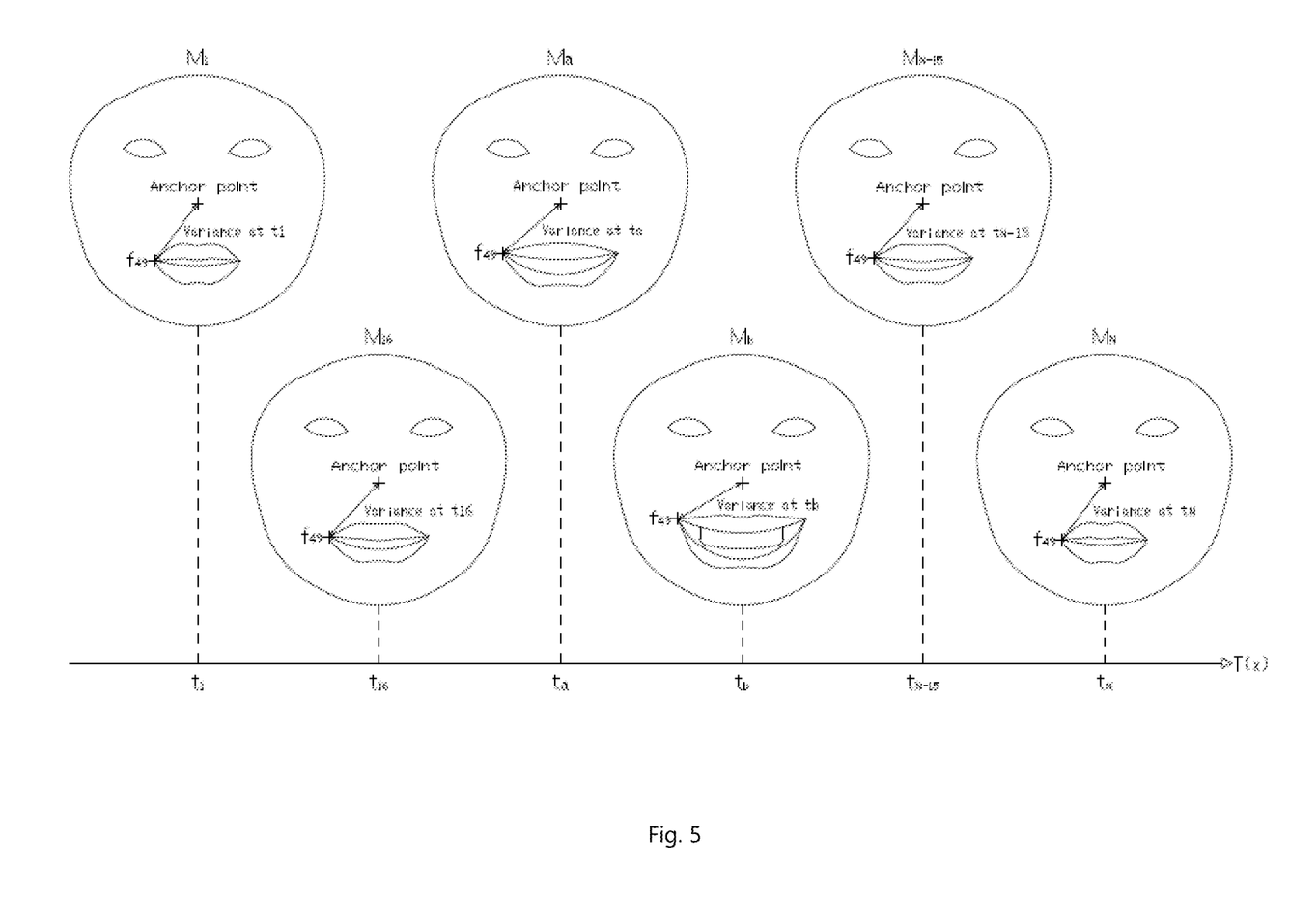
FIG. 5 illustrates an exemplarily video clip over a duration showing the relative positions of the facial landmark $f_{49}$ at $t_1$, $t_{16}$, $t_a$, $t_b$, $t_{N-15}$ and $t_N$.

For each of the facial landmarks fx (where fx is $f_{49}$, $f_{50}, \ldots,$ or $f_{68}$) the system obtains a volume—Res_fx(t) at each unit time slot to represent the change of the facial landmark during the relevant time period. The "volume" may be an accumulation of the change in the position, in the distance, in the angle, or any combination of the above over a particular time period. The volume Res_fx(t) can be obtained through a conversion. For instance, it may be obtained through converting a facial landmark's coordinates, angle, distance, position or relative position, etc. In one embodiment, the volume Res_fx(t) is defined as the positional change of a facial landmark at a unit time slot in relation to a prescribed anchor point (e.g. the nose tip). It may be an accumulated value by integrating the positions over the time period. For instance, Res_fx($t_3$) is obtained by integrating the traces of a facial landmark from $t_1$ to $t_3$. FIG. 5 exemplarily shows how the relative positions of the facial landmark $f_{49}$ at $t_1$, $t_{16}$, $t_a$, $t_b$, $t_{N-15}$ and $t_N$ change with respect to the nose tip over the time. In another embodiment, the calculation of volume may also take the width of the user's face into account to eliminate the scaling issue. As shown, the corresponding volume Res_$f_{49}$(t) (where t is $t_1, \ldots,$ or $t_N$) at each of the relevant unit time slots can all be observed. The present invention poses no limitation on how to obtain the values, and the above are mere examples to demonstrate the operation of the present invention.

Figure 6:
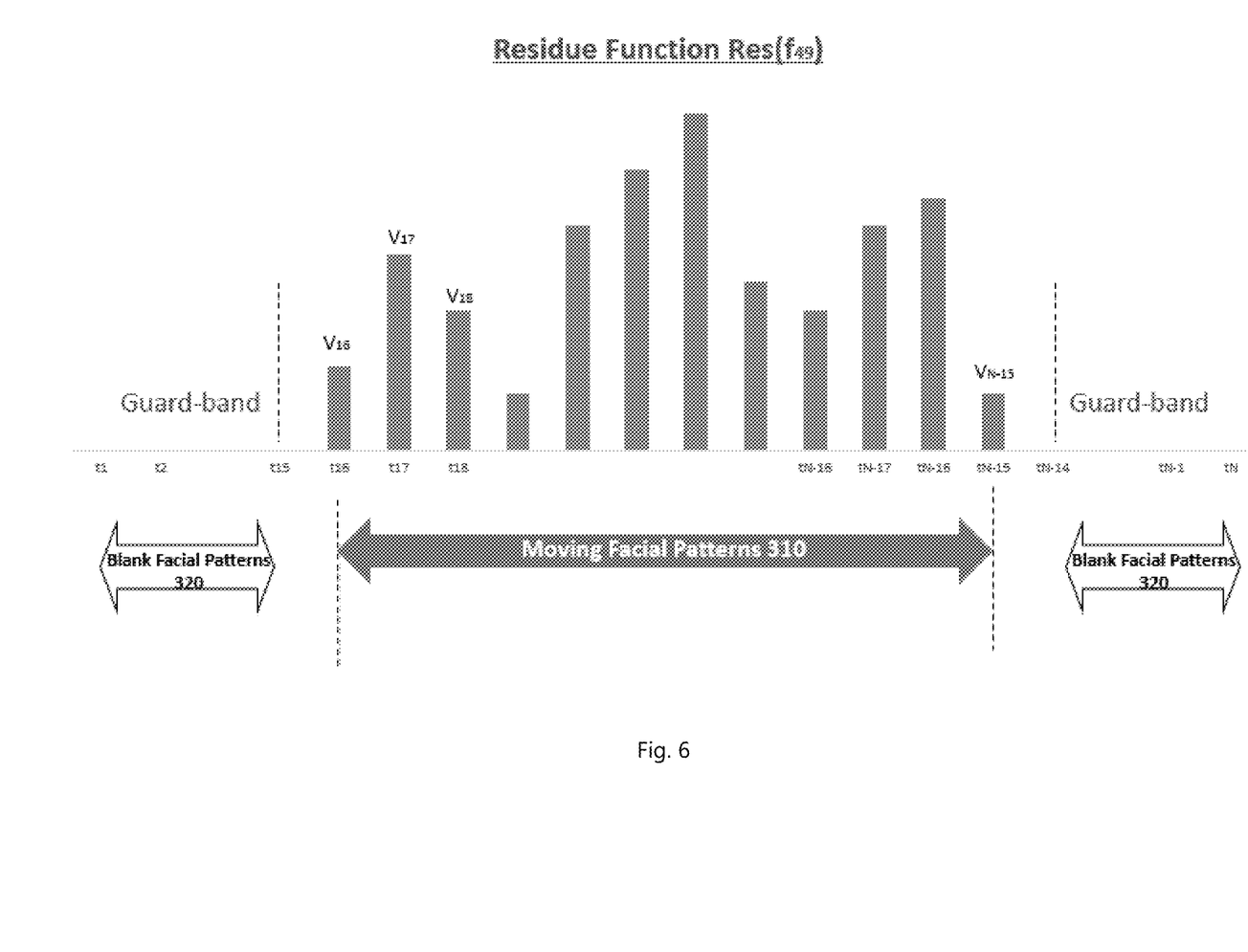
FIG. 6 is a bar chart of an example illustrating the facial landmark $f_{49}$.

Once the volumes of a facial landmark are obtained, a bar chart of the facial landmark fx in view of the duration T can also be portrayed. By recording the volumes, the system 100 can understand how each facial landmark varies over the time. FIG. 6 is an example illustrating a bar chart of the facial landmark $f_{49}$ where the x-axis is time while the y-axis represents the volume at each of the unit time slots. Assuming the volumes at $t_{16}$, $t_{17}$, and $t_{18}, \ldots$ are $V_{16}$, $V_{17}$, and $V_{18} \ldots$ respectively. The volumes for the facial landmark $f_{49}$ can be represented by: Res_$f_{49}$(t), namely a residue function.

The processing unit 130 of the system 100 then mathematically integrates the residue function. The result of the integral therefore obtained is defined as the residue value for the facial landmark $f_{49}$ and represented as RES($f_{49}$). Clearly, in the present invention the calculation does not merely consider the period during which the smiling is made (i.e. from $t_{16}$ to $t_{N-15}$); additionally, the system 100 of the present invention also takes into account the time intervals where the blank expressions are made (i.e. in the present embodiment, $t_1$ to $t_{15}$, and $t_{N-14}$ to $t_N$). In other words, the integral range is the entire duration T from $t_1$ to $t_N$. The formula of integral is as follows:

$$RES(fx) = \int_{t1}^{tN} (Res\_fx(t))dt, \text{ where } fx \text{ is } f_{49}, f_{50}, \ldots, \text{ and } f_{68}$$

The duration where the blank facial patterns or other delimiting patterns 320 occur functions as guard-bands surrounding the moving facial patterns 310, and in effect, they serve as a parity check and delimiter for recognition of the default facial motion. Although the volumes for those blank facial patterns are shown constantly null in FIG. 6, their values could be otherwise subject to the same volume determination discussed above. That is, in the present invention one may define a threshold, and blank facial patterns present if the volumes regarding the patterns are below the threshold.

Based on the same calculation, the reside values, i.e. RES($f_{49}$), RES($f_{50}$), . . . RES($f_{68}$), for all the 20 facial landmarks can all be derived. They altogether constitute the variation vector represented as RES(X)={RES($f_{49}$), RES($f_{50}$), . . . RES($f_{68}$)}, of the default facial motion, which is a smiling in the present embodiment. Plainly, the variation vector is the so-called predetermined profile of the user's smiling. The predetermined profile will be used in the later comparison to determine if another smiling is made by the user to, for instance, unleash the associated function.

As mentioned, a guard-band appears on the both sides of the moving facial patterns 310. The establishment of the predetermined profile for the default facial motion, e.g. a smiling, in accordance with the present invention not only considers the changes of the facial landmarks during the moving stage, but also the unchanged status during the blank expression, i.e. before and/or after the smiling is made. It is critical for the present invention to take both moving and blank stages into account. The reason is, even if a very similar facial motion is made, the system will not positively recognize it if there are other non-blank expressions accompanying with the crucial motion, say a smiling, because their profiles will not match.

Figure 7:
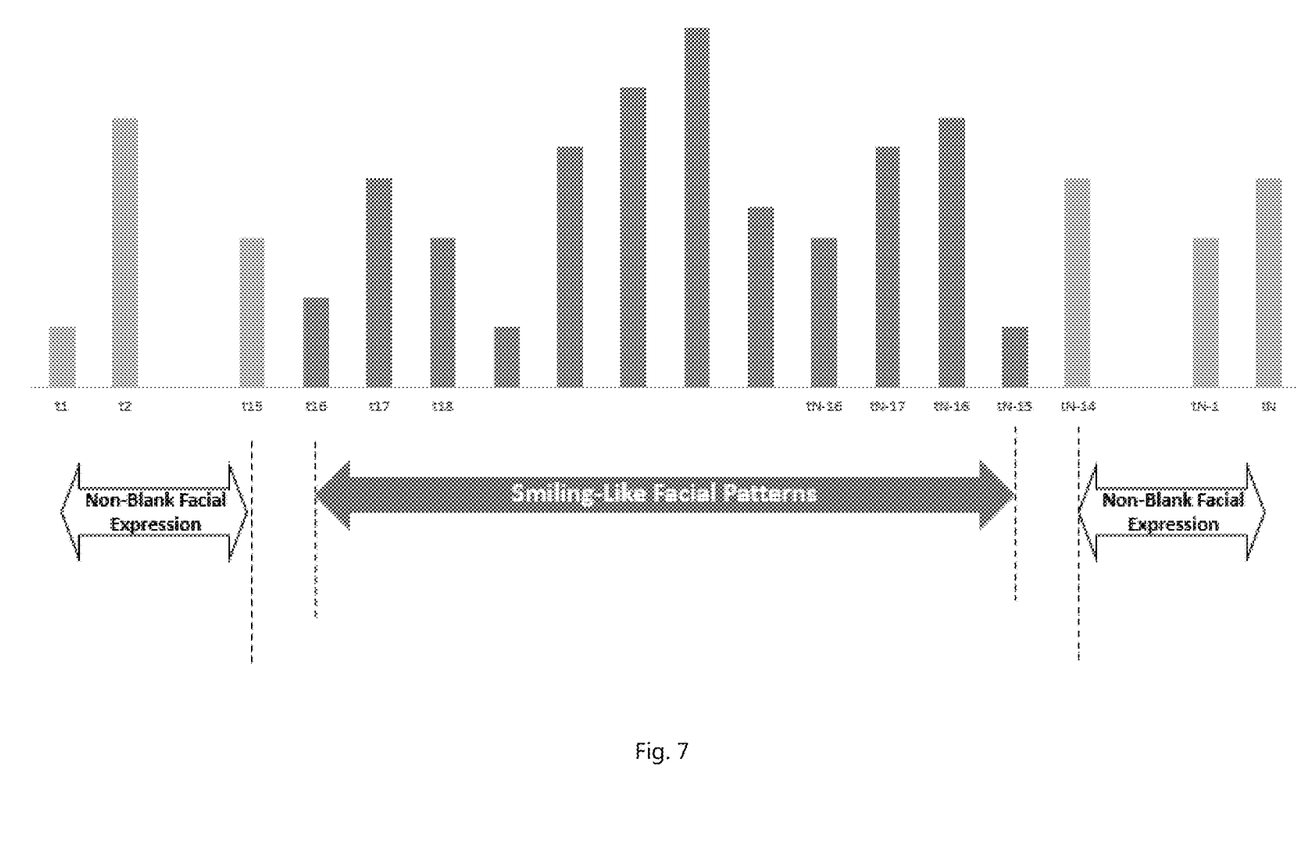
FIG. 7 a bar chart of showing a smiling-like facial patterns accompanying with other facial expressions.

Taking the previous talking scenario, as shown in FIG. 7, even if the user may have similarly made a smiling facial movement while talking, but because there are some other facial movements accompanying with the smiling-like patterns (i.e. the expressions accompanying before and after the smiling-like pattern are not blank), taking the totality, the variation vector, i.e. the profile of the smiling-like facial motion, obtained therefore will not be identical to that of a pure smiling. Thus, by adding at least one guard-band into the establishment of the profile, the facial recognition system and method of the present invention can further enhance the accuracy of recognition and eliminate the chance of false identification.

In the above embodiment, the calculation of the volume Res_fx(t) is made resorting to a single facial landmark at a time. However, as a person of ordinary skill would appreciate, such calculation is a mere example. One, alternatively, may combine two or more facial landmarks as one to calculate the volume Res_fx(t). For instance, a volume can be the trace of an angle of any three facial landmarks, or of a distance between any two facial landmarks, etc.

Moreover, in the above example, blank expressions are designated to be the guard-bank of the default facial motion, but it does not have to be the case. In other scenarios, one may choose to use any particular facial expression serving as the guard-band to distinguish the default facial motion from others so long as the volumes of the particular expression are below a defined threshold.

Figure 8:
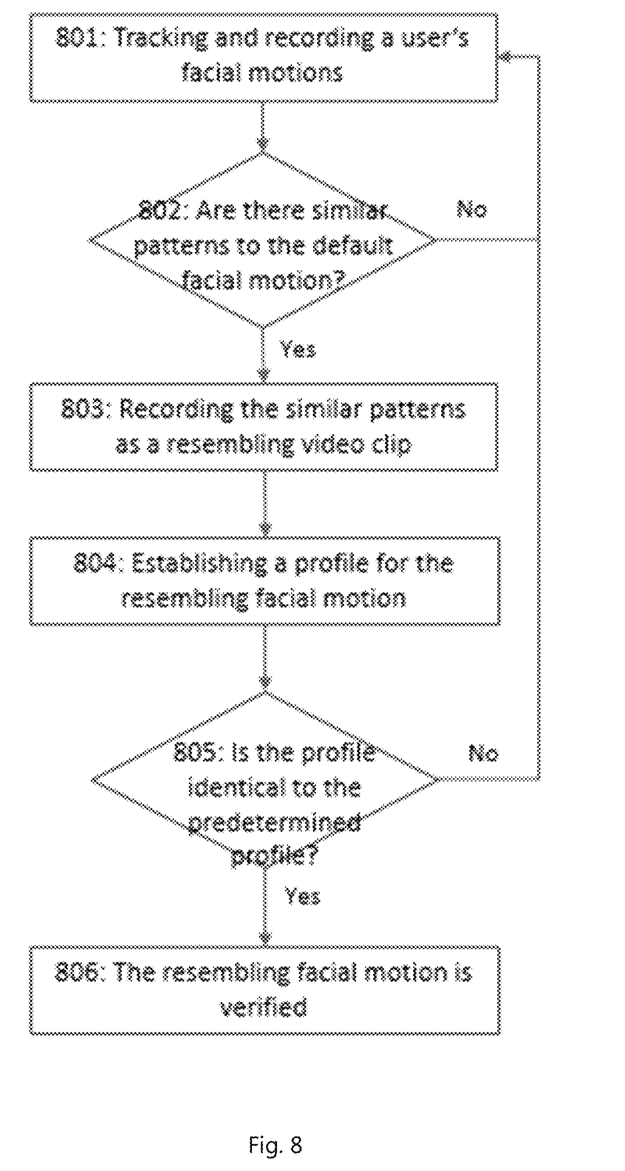
FIG. 8 is a flowchart showing the processes of motion-based facial recognition in accordance with the invention.

Once the predetermined profile is established, the facial recognition system 100 of the present invention can verify facial motions based on the predetermined profile. The steps of such are illustrated in FIG. 8 and will be explained in detail in the following paragraphs with reference to FIG. 2.

In one embodiment, assuming the user's ID is not an issue. In Step 801, the camera 110 continuously tracks and records a user's facial motions. Meanwhile, the processing unit 130 also determines whether the tracked facial motion is similar to the previously recorded default facial motion, e.g. a smiling (Step 802). If so, the camera 110 records it as a resembling video clip over a duration T (Step 803). Likewise, the resembling video clip includes a plurality of critical facial patterns where the resembling facial motion is made, and a plurality of secondary facial patterns existing before, after, or before and after the resembling facial motion. The secondary facial patterns are where at least one facial expression other than the resembling facial motion is made. The duration is also sliced into a plurality of unit time slots.

Then the system 100 goes on to establish a profile of the resembling facial motion in the same way as the establishment of the predetermined profile (Step 804). In brief, the processing unit 130 tags the same 20 facial landmarks from each of the critical and the secondary facial patterns. The volume of each facial landmark at each of the unit time slots can be obtained. Consequently, the bar chart as well as the residue function for each of the facial landmarks can be derived. The processing unit 130 then mathematically integrates each of the residue functions for each of the facial landmarks to obtain a residue value according. The combination of all the residue values is the profile (i.e. the vector variation) of the resembling facial motion. It is noteworthy that the integral calculation here also considers both the resembling facial motion as well as the an/other facial expression(s). Thus, by the same approach, the profile of the resembling facial motion can be built.

Once the profile of the resembling facial motion is derived, the processing unit 130 compares the profile with the predetermined profile stored in the database 110 to determine if the resembling facial motion consists with the default facial motion (Step 805). If so, the system 100 verifies the resembling facial motion (Step 806).

Because of the existence of the guard-band, i.e. the blank expression, in the present invention, the system 100 will never misjudge the resembling facial motion simply because the critical facial patterns (where the resembling facial motion, i.e. a smiling-like motion, involves) are entirely identical to the moving facial patterns 310 (where the default facial motion, i.e. a smiling, is concerned). The system 100 of the present invention will also look into the facial expression occurring before, after, or before and after the resembling facial motion to determine if the user is factually making a smiling (i.e. the default facial motion).

Further, the verification in accordance with the present invention stops if the profiles are matched. However, as has been disclosed in the '053 parent application, one may take a further step, such as applying a dynamic time warping (DTW) technique, to better verify the facial motion.

Figure 9:
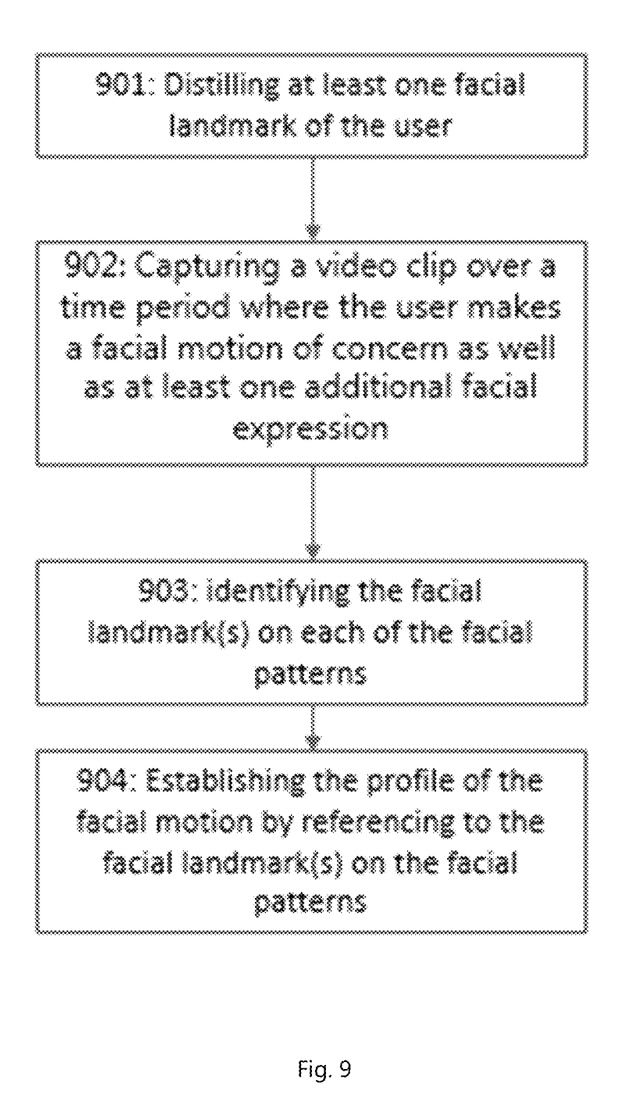
FIG. 9 is a flowchart showing the processes of establishing a profile of a facial motion for the sake of facial recognition in accordance with the present invention.

FIG. 9 briefs the steps of establishing a profile of a facial motion. The method may be applied to build the above profile of the resembling facial motion as well as the predetermined profile.

As prerequisite, the system 100 distills at least one facial landmark of the user (Step 901). The facial landmark(s) is/are stored in the database 120. Further, the camera 110 capturing a video clip over a duration where the user makes a facial motion of concern as well as at least one additional facial expression (Step 902). It should be noted that the video clip includes a plurality of primary facial patterns where the user makes the facial motion of concern, and a plurality of collateral facial patterns where the user makes the additional facial expression before, after, or before and after the facial motion is made. The processing unit 130 of the present invention can classify the facial patterns into either one of the two types, i.e., primary or collateral facial patterns, through, for instance, a predefined threshold. Next, the processing unit 130 tags the facial landmark(s) on each of the primary and collateral facial patterns (Step 903). Lastly, the processing unit 130 establishes the profile of the facial motion by referencing to the facial landmark(s) on the primary and collateral facial patterns (Step 904).

In one embodiment, if the method is adopted to establish the predetermined profile of the default facial motion, the primary facial patterns are the moving facial patterns described above where the user makes the default facial motion, e.g. a smiling; while the collateral facial patterns are the blank facial patterns where the user makes a blank expression. It should be noted that there could be more than one predetermined profile and each of them is association with one or more functions.

In another embodiment, if the method is used for the establishment of the profile concerning a resembling facial motion subject to recognition, the primary facial patterns are the stage where the resembling facial motion is made, e.g. smiling-like patterns; while the collateral facial patterns are the facial expression(s) accompanying the resembling facial motion. As discussed, the accompanied facial expression(s) may occur before, after, or before and after the resembling facial motion.

Additionally, for the sake of clarification, the establishment of a profile may further include the following steps (not depicted in FIG. 9). Firstly, the processing unit 130 calculates a plurality of volumes for each of the facial landmarks based on the critical and the secondary facial patterns. The volumes represent the changes of the facial landmark over the duration. The change may be in the position, in the distance, in the angle, or any combination of the above. Once the volumes represented by a residue function are obtained, the processing unit 130 mathematically integrates the residue function of the facial landmark over the duration to obtain a residue value of the facial landmark. In the scenario where only one facial landmark is considered, the residue value (i.e. the vector variation) is the profile of the facial motion. If, on the other hand, more than one facial landmarks are considered, the profile is the combination of the residue values of all facial landmarks.

The above embodiments all assume that the user's ID is not an issue probably because it has been verified either by the conventional way or by the approaches disclosed in the '053 parent application. Alternatively, even if the user's ID has not been authenticated, the verification of a facial motion will also and always accompany with the authentication of the identity because the identification of a user's facial landmarks is involved in the present invention.

Although the above embodiments use an example of a single facial motion to clarify how the instant invention works, the system and the method of the invention will also be applicable to multiple facial motion instances or a sequence of facial motion instances. For example, if two continuous facial motions, e.g. smiling-and-blinking together are the default facial motions to embark a binding operation. The guard-band of the smiling (the first facial motion), can be a blank expression occurs before it and/or the initial first few facial patterns of the blinking (the second facial motion) after the smiling. Additionally, the guard-band of the blinking (the second facial motion) can be the last few facial patterns of the smiling (the first facial motion) and/or a blank expression occurs after it. Alternatively, the system 100 of the present invention may simply consider the smiling-and-blinking as one facial motion and conduct the same approach as described above.

Although the invention has been described and illustrated in the above description and drawings, it is understood that this description is by example only and that numerous changes and modifications can be made by those skilled in the art without departing from the true spirit and scope of the invention.

What is claimed is:

1. An apparatus of facial recognition based on profiles of facial motions, comprising:
    a database that stores a predetermined profile of a default facial motion of a user including a plurality of facial patterns comprising at least one facial landmark and a predefined anchor on the user's face made from a first video clip of the user;
    a camera that captures second video clip of the user; and
    a processing unit connected to the database and the camera, the processing unit configured to establish the predetermined profile of the default facial motion and to establish a comparison profile from a facial motion captured over a duration from each of the second video clips through a profile establishment process, the processing unit further configured to track facial motions over the duration by comparing the default facial motion stored in the predetermined profile with the second video clips of the user and determine whether the comparison profile matches data stored in the predetermined profile.

2. The apparatus of claim 1, wherein the profile establishment process comprises: the processing unit classifying a video dip over a duration captured by the camera into a plurality of facial patterns wherein a default facial motion is determined to be comprised of primary facial patterns, and classifying a plurality of collateral facial patterns as one of a) before the default facial motion, b) after the default facial motion, or 3) before and after the default facial motion over the duration.

3. The apparatus of claim 1, wherein a function is to be performed by the processing unit when a determination is made that establishes a comparison profile matches a stored predetermined profile.

4. The apparatus of claim 1 wherein the processing unit determines volume as a relative position of the facial landmark in relation to the predefined anchor on the user's face.

5. The apparatus of claim 2, wherein the primary facial patterns are moving facial patterns and the collateral facial patterns are blank facial patterns.

6. The apparatus of claim 2, wherein the processing unit establishes at least one facial landmark on each of the primary facial patterns and the collateral facial patterns.

7. The apparatus of claim 6, wherein the processing unit obtains a plurality of volumes of the facial landmark; and the processing unit mathematically integrates the volumes over the duration to obtain a residue value of the facial landmark.

8. A method of facial recognition based on profiles of user facial motions having at least one facial landmark, comprising:
    establishing a predetermined profile of a default facial motion through a profile establishment process;
    capturing a video clip over a duration during which the user makes at least one facial motion;
    establishing a comparison profile of the captured facial motion through the profile establishment process; and
    comparing key points of the comparison profile with the predetermined profile to identify the captured facial motion.

9. The method of claim 8, wherein the predetermined profile is built from a plurality of facial patterns wherein the default facial motion is determined to be a plurality of primary facial patterns, and a plurality of collateral facial patterns as one of a) before the default facial motion, b) after the default facial motion, or 3) before and after the default facial motion over a duration.

10. The method of claim 8, wherein the confirmative verification results in a performance of a function associated with the default facial motion in the establishment process.

11. The method of claim 8, wherein the profile establishment process involving building a profile concerning a facial motion comprises:
    obtaining a video clip over a duration has a plurality of primary facial patterns where the user makes the facial motion, and a plurality of collateral facial patterns where the user makes at least one facial expression before, after, or before and after the facial motion;
    identifying at least a facial landmark on each of the primary and collateral facial patterns;
    obtaining a plurality of volumes of the facial landmark based on the primary and the collateral facial patterns; and
    mathematically integrating the volumes over the duration to obtain a residue value of the facial landmark.

12. The method of claim 11, wherein the volume is the relative position of the facial landmark in relation to a predefined anchor on the user's face.

13. A computer program product for facial recognition based on profiles of facial motions made by a user having at least one facial landmark and a predefined anchor on the user's face, in a device or network, the computer program product being embodied in a non-transitory computer readable storage medium and comprising computer instructions for:
    establishing a predetermined profile of a default facial motion through a profile establishment process using a first video clip;
    capturing a second video clip over a duration during which the user makes a facial motion;
    establishing a comparison profile of the captured facial motion through the profile establishment process; and
    comparing the comparison profile with the predetermined profile to determine if the profiles match.

14. A computer product as recited in claim 13, wherein a match of comparison profile and predetermined profile determines the performance of a function associated with the default facial motion during the establishment process.

15. A computer product as recited in claim 13, wherein the predetermined profile is built based upon a plurality of moving facial patterns where the user makes the default facial motion, and a plurality of collateral facial patterns as one of a) before the default facial motion, b) after the default facial motion, or 3) before and after the default facial motion over a duration.

16. A computer product as recited in claim 15, wherein the profile establishment process involving building a profile concerning a facial motion comprises:
- identifying the facial landmark on each of the primary and collateral facial patterns;
- obtaining a plurality of volumes of a facial landmark in the primary and the collateral facial patterns; and
- mathematically integrating the volumes over a duration to obtain a residue value of the facial landmark.

17. A computer product as recited in claim 16, wherein the volume is the relative position of the facial landmark in relation to a predefined anchor on the user's face.

* * * * *